United States Patent
Hausner et al.

(10) Patent No.: US 6,553,354 B1
(45) Date of Patent: Apr. 22, 2003

(54) METHOD OF PROBABILISTICALLY MODELING VARIABLES

(75) Inventors: Christopher Karl Hausner, Sterling Heights, MI (US); Daniel Peter Golec, Ann Arbor, MI (US); Stephen Frederick Bruce, Farmington Hills, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 09/542,412

(22) Filed: Apr. 4, 2000

(51) Int. Cl.$^7$ .............................................. G06F 17/00
(52) U.S. Cl. ............................................ 706/1; 706/52
(58) Field of Search ....................... 706/1, 52

(56) References Cited

U.S. PATENT DOCUMENTS 6,061,610 A * 5/2000 Boer .............................. 701/1

OTHER PUBLICATIONS

Modeling and measuring the effects of vagueness in decision models, Chavez, T.; Systems, Man and Cybernetics, Part A, IEEE Transactions on , vol.: 26 Issue: 3, May 1996, pp. 311–323.*

Tradeoffs in knowledge–based construction of probabilistic models, Provan, G.M.; Systems, Man and Cybernetics, IEEE Transactions on , vol.: 24 Issue: 11, Nov. 1994, pp. 1580–1592.*

Multitarget tracking in clutter: fast algorithms for data association, Zhou, B.; Bose, N.K. Aerospace and Electronic Systems, IEEE Transactions on, vol.: 29 Issue: 2, Apr. 1993, pp. 352–363.*

PSACOIN level 0 intercomparison–an international verification exercise on a hypothetical safety assessment case study, Saltelli, A.; Andres, T.H.; Goodwin, B.W.; Sartori, E.; Carlyle, S.G.; System Sciences, 1989. vol. II: Software Track, 1989 pps. 267–274.*

* cited by examiner

Primary Examiner—John A. Follansbee
Assistant Examiner—Michael B. Holmes
(74) Attorney, Agent, or Firm—F. G. McKenzie

(57) ABSTRACT

A method 10 for analyzing the attribute of a product by probabilistically modeling certain variables associated with the product.

7 Claims, 2 Drawing Sheets

METHOD OF PROBABILISTICALLY MODELING VARIABLES

FIELD OF THE INVENTION

This invention generally relates to a method for probabilistically modeling variables and more particularly, to a method for analyzing and selectively displaying the probabilistic relationship between the various permissible values of at least two variables.

BACKGROUND OF THE INVENTION

A process, condition, attribute, or phenomena, or an occurrence of such a condition, process, or phenomena is typically dependent upon the occurrence of and/or type of and/or value of other various events or conditions ("the underlying variables"). For example and without limitation, the length of an individual's life may be related to such variables as the age of the individual as well as to certain habits of the individual (e.g. smoking). Further by way of example and without limitation, the overall reliability attribute or characteristic of a particular vehicle may be related to the age or the time in service of the vehicle. Warranty events and, more particularly, the occurrence of such warranty events may also be related to the age of the vehicle.

In order to understand or analyze the occurrence of an event or the event itself and/or in order to analyze the various attributes of an item, it is desirable to understand or analyze the interrelationship between at least some of these various underlying variables (i.e., the manner in which certain combinations of different types or values of these underlying variables influence or effect the event or the occurrence of the event and/or the manner in which these combinations evidence the existence, non-existence, or characteristics of these attributes).

While many techniques exist to generally analyze or investigate the relationship of some of these variables to the condition/event or attribute of interest, none of the current techniques provide a substantial and accurate analysis of the overall reliability of a manufactured good, such as a vehicle, and the number of warranty claims associated with or predicted to be associated with a particular vehicle. Further, none of these techniques accurately allows or provides for an analysis of the potential occurrence of certain underlying variable combinations, effective to allow one to accurately make certain predictions or analyses of an event or phenomena and to allow one to create or devise certain programs or procedures related to a manufactured item or good (i.e., warranty protection programs, insurance programs, and service programs).

There is therefore a need for a new and improved method for ascertaining the nature of an attribute or characteristic of a good, such as a vehicle, and for analyzing events and/or occurrences of events related to the good (e.g. warranty claims).

SUMMARY OF THE INVENTION

It is a first object of the present invention to provide a method for analyzing events or occurrences of such events which overcomes the various and previously delineated drawbacks of prior methods.

It is a second object of the present invention to provide a method for analyzing various variables and/or conditions of a vehicle which overcomes the various and previously delineated drawbacks of prior methodologies and which allows for a relatively accurate indication and/or assessment to be made of the overall reliability of the vehicle.

It is a third object of the present invention to provide a method for analyzing the interrelationship between various underlying variables, effective to provide an indication of the liklihood of the occurrence of these variables and further effective to allow for the overall reliability of a vehicle to be measured.

According to a first aspect of the present invention, a method is provided for analyzing an attribute of a product. The method includes the steps of creating a first variable; creating a second variable; providing a first value for the first variable; providing a second value for the second variable; computing the likelihood that the first variable will have the first value when the second variable has the second value; and analyzing said attribute by use of said computed likelihood.

According to second aspect of the present invention, another method is provided. The method includes the steps of identifying a first vehicle having a first time in service when the first vehicle was driven a certain first distance; identifying a second vehicle having a second time in service when the second vehicle was driven a second distance; creating a first data point by use of the first time in service and the first distance; creating a second data point by use of the second time in service and said second distance; and assigning a certain respective probability to the first and to the second data points.

These and other features, advantages, and aspects of the present invention will become apparent by reading the following detailed description of the preferred embodiment of the invention and by reference to the following drawings.

DETAILED DESCRIPTION OF THE PREFERRED EMBODIMENT OF THE INVENTION

Figure 1:
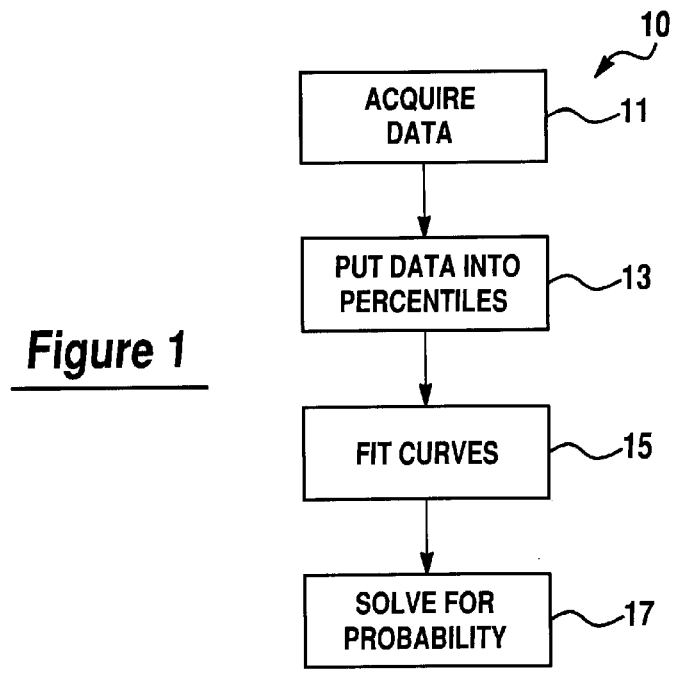
FIG. 1 is a flowchart illustrating the sequence of steps which comprise the methodology of the preferred embodiment of the invention.

Referring now to FIG. 1, there is shown a flowchart 10 which illustrates the analysis methodology of the preferred embodiment of the invention. It should be appreciated that although the following discussion describes the use of the methodology of the preferred embodiment of the invention for the analysis of vehicles, it may also be used to analyze a wide variety of other products, conditions, phenomena, and events based upon a probabilistic modeling of the respective underlying variables, and that nothing in this application should limit the applicability of this methodology to the above delineated vehicular analysis.

In the first step 11 of the methodology 10, data is acquired from at least two vehicles. The data corresponds to or is equal to the "mileage" or to a first distance that a first of the vehicles has traveled, and the time in service or age of the vehicle when it was driven that first distance. The data further includes a second distance that a second of the vehicles has traveled and the corresponding time in service or age of the second vehicle when this second vehicle was driven the second distance. Additional data (i.e. other respective and corresponding mileage and time in service data) may also be obtained for these vehicles and used by the methodology of the preferred embodiment of the invention. Further, such data may also be acquired from other vehicles representative of and/or comprising a portion of the vehicle or population which is to be analyzed. In the preferred embodiment of the invention, such data is acquired from a large number of such vehicles. In another non-limiting embodiment of the invention, the data is only acquired from a certain type of vehicle or from vehicles manufactured and/or sold by a single business entity and/or produced/ created from a single manufacturing plant.

Figure 2:
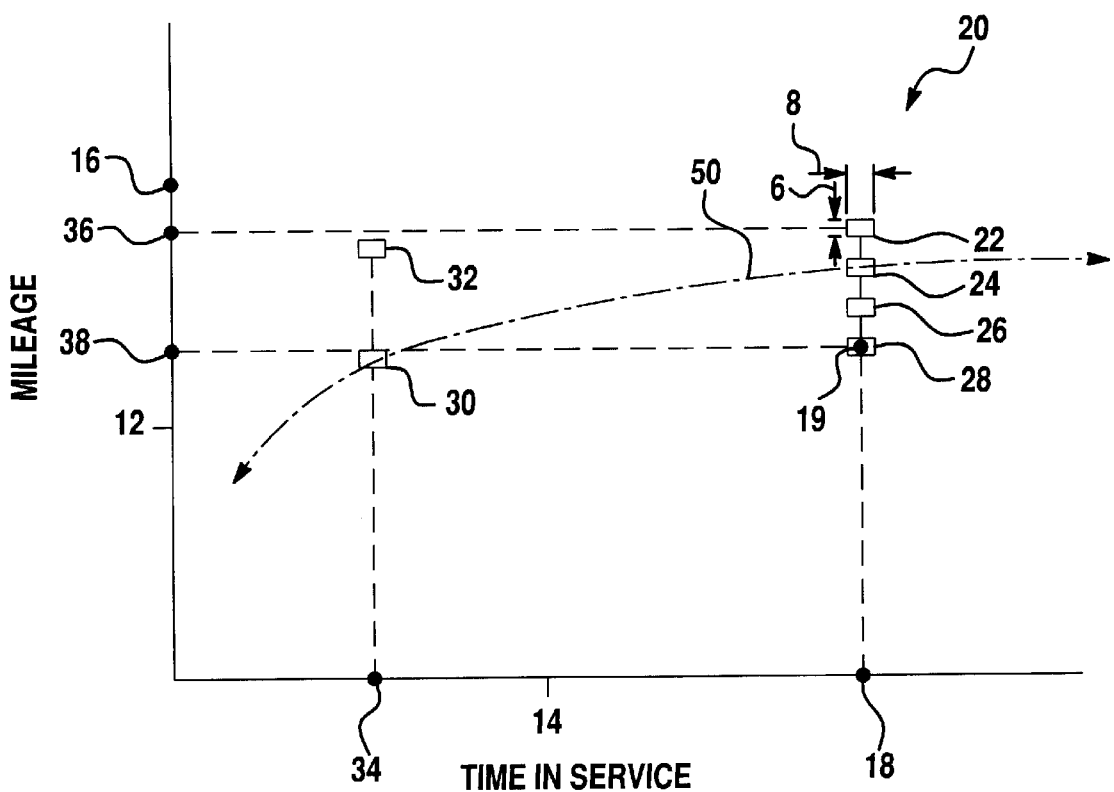
FIG. 2 is a graph illustrating the collection of acquired data which is used by the methodology of the preferred embodiment of the invention and further including various curves which are created by the methodology of the preferred embodiment of the invention.

The acquired data may be selectively stored in a computer. A graph such as graph 20 in FIG. 2 may also be created by and/or stored within the computer. As shown, graph 20 includes a first axis 12 corresponding to and/or representing a vehicular mileage metric or measure and a second axis 14 corresponding to and/or representing a time in service metric or measure or a vehicular age metric or measure. Hence, each point 16 on axis 12 corresponds to a unique mileage value and each point 18 on axis 14 corresponds to a unique time in service or age value.

Each "portion" or "piece" of acquired vehicular data, such as portion 19, may be placed upon graph 20 at a location which corresponds to or is substantially equal to the respective value of the mileage and time in service of the acquired data (i.e., each "portion" of acquired vehicular data has a respective mileage component and a respective time in service or age component which cooperate with axes 12, 14 to "fix" a certain location within graph 20 for that portion of acquired vehicular data). Moreover, each portion of data, such as portion 19, corresponds to data acquired from a single vehicle. It should be realized that the need for such "data graphing" may be obviated by the use of a computer or other stored program type devices and that the acquired data may be electronically stored within memory or selectively displayed upon a computer display in such a graphical format.

In the next step 13 of the methodology 10 of the present invention, groupings or probabilistic percentiles, such as groupings 22, 24, 26, 28, 30, and 32 are created. Particularly, the data in a grouping 22–32 has a substantially similar time in service value and a substantially similar mileage value. Alternatively, the data in a grouping 22–32 resides within a substantially similar and predetermined mileage and time in service range. Hence, each grouping 22–32, such as grouping 28, has a unique location upon graph 10 which is fixed by the time in service to which the data that forms this grouping pertains (i.e. which may be denoted by a value or a single data point 18) and a mileage value which is fixed by the mileage of the data which was used to form the group (i.e. which may be denoted by a value or a single data point 38). For example, a grouping 22–32 has a length 8 which is equal to a range of time in service values represented by the data contained within the group 22–32 and a height 6 which is equal to a range of mileage values represented by the data contained within the group 22–32. If all of the contained data within a group 22–32 has a substantially identical time in service and mileage value, the group 22–32 may be represented by a single point upon the graph 20. In one embodiment of the invention, each of the groups 22–32 are formed by grouping data according to mileage percentile multiples of about five percent (i.e. a group 22–38 represents a certain data percentile which is a multiple of about five percent). For example, data within the seventy-fifth percentile group 22 has a corresponding mileage value 36 (or a range of mileage values) which is or are greater than about seventy-five percent of the respective mileage values of the other groups of data 24, 26, 28 which have substantially the same age or time of service value 18 as does group 22. Similarly, data within the tenth percentile group 26 has a corresponding mileage value (or a range of mileage values) which is or are greater than only about ten percent of the respective mileage values of the other groups 22, 24, and 28 having the same age or time of service value 18 as does group 26.

In step 15 of the methodology 10 of the present invention, curves, such as curves 50, are created or "fitted" by the use of a conventional curve fitting technique. Each curve connects all of the created percentile groupings corresponding to a unique one of the percentiles (i.e., curve 50 connects all of the seventy-fifth percentile groups 30 and 24). Each of these curves 50 may be constructed by the use of a respective second or third, or "$n^{th}$" or "multiorder" polynomial equations. The resulting polynomial equations are bounded by the range observations.

Figure 3:
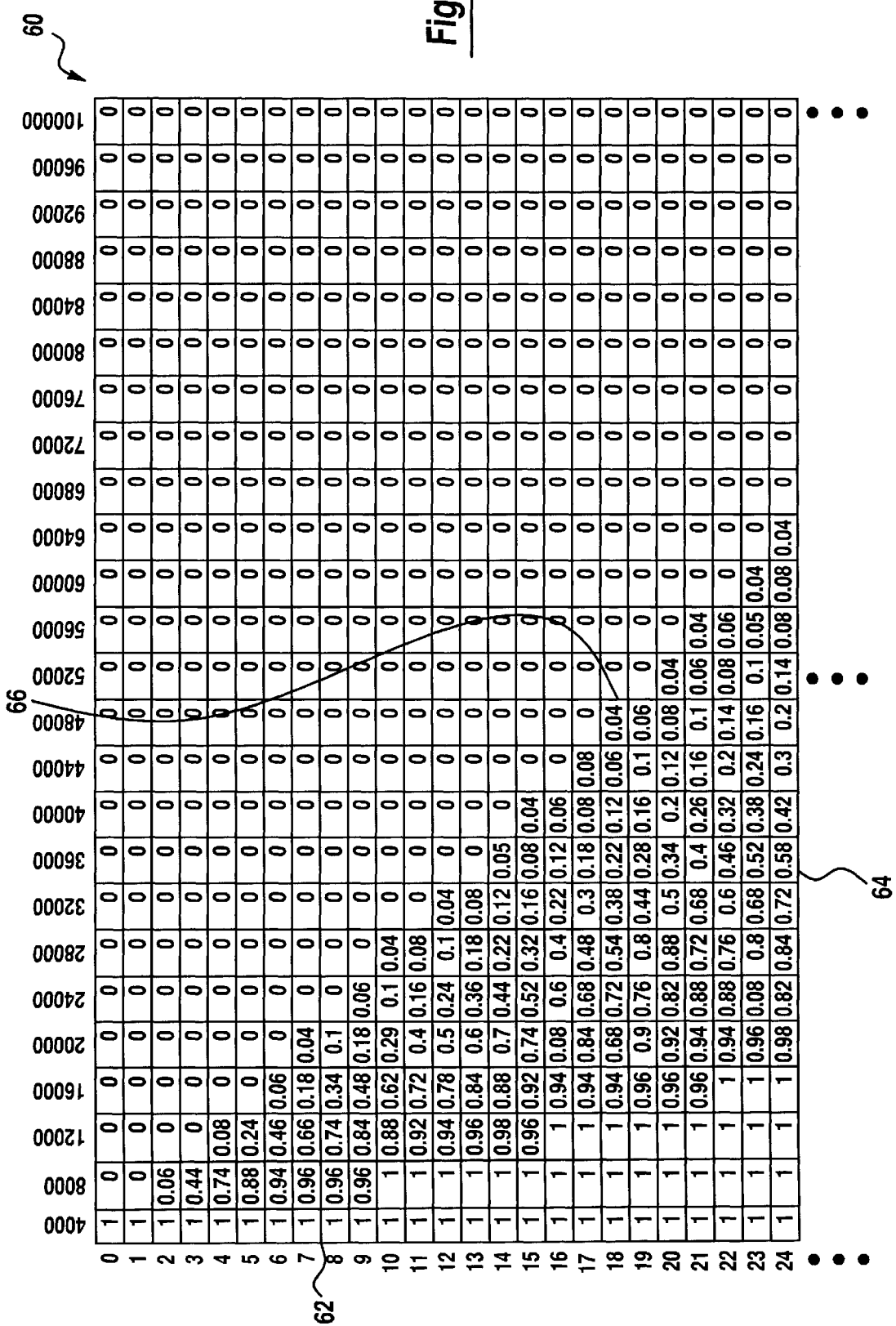
FIG. 3 is an illustration of a probabilistic table which is created by the methodology of the preferred embodiment of the invention.

In the last step 17 of the methodology 10 of the present invention, a probability is assigned and/or computed for each group 22–32 thereby creating the table 60 which is shown in FIG. 3. Particularly, table 60 has a first axis 62 and a second axis 64 which respectively correspond to axes 12, 14 of graph 20. Table 60 further has values 66, each of which corresponds to a unique one of the percentile groups (i.e. group 22). Each value 66 is substantially equal to the probable occurrence of the unique grouping 22–32 to which it pertains.

Particularly, this "probability value" is determined for a grouping or point, such as grouping 28, in one non-limiting embodiment of the invention by noting the percentage of groupings 26, 24, and 22 which have a greater amount of mileage at the time in service to which this grouping 28 pertains. The fitted equations may also be used to determine the number of groupings greater than this grouping by using or "solving" the equations for a certain time in service value (i.e., obtaining mileage value for each of these equations at this time in service value) and using the solution of the equations to note the percentage of or number of mileage entries residing "below" (i.e., having a smaller amount of mileage) than the group of interest. This percentage may then be subtracted from the number "one" in order to obtain the desired probability.

It should be realized that the created probability values 66 allow one to quickly and efficiently ascertain the likelihood that a vehicle will be driven a certain amount of miles in a certain time period, thereby allowing a warranty, insurance, or other vehicular service program to be efficiently and quickly created to meet the needs of the owners and/or operators of these vehicles. Further, the overall reliability attribute or characteristic of these vehicles may be quickly and efficiently determined by identifying the probability that a produced vehicle will be driven for a great distance or used for a relatively long length of time (i.e., presumably a reliable vehicle will be in service for a long time and driven a great distance). Further, the use of this actual "field" data allows one to quickly and efficiently determine the range of actual values which commonly occur for these two variables (i.e., time in service and mileage) and to determine common types of variable value occurrences (i.e., those having a respective probability value 66 which is relatively high).

This data also allows one to analyze the reliability of a vehicle by the use of "real" or experienced "permissible" variable values and not artificially created values which have substantially no basis in active vehicle use. Also, the analyzed data also allows a manufacturer or provider of these vehicles to obtain and/or specify components having a respective operating life which meets or exceeds the time in service and mileage which typically occurs and/or is "experienced" for these vehicles.

It is to be understood that the invention is not limited to the exact construction and method which has been illustrated and discussed above but that various changes and modifications may be made without departing from the spirit and the scope of the invention as is more fully delineated in the following claims.

What is claimed is:

1. A method for evaluating the reliability of a certain type of vehicle comprising the steps of:

identifying a plurality of said vehicles of said certain type;

acquiring data from each of said plurality of identified vehicles, wherein said data includes at least a first measurable metric for each of said plurality of identified vehicles and at least a second measurable metric for each of said plurality of identified vehicles;

creating a graph of said data by plotting each of said first and second metrics relative to each other;

forming said data into discrete percentile groupings, wherein each of said discrete percentile groupings include data from each identified vehicle which are within a certain range of said first and said second metrics; and assigning a probability of occurrence to each percentile grouping by forming curves upon said graph which connects all of said discrete percentile groupings corresponding to a unique one of said percentiles.

2. The method of claim 1 wherein said data comprises mileage and time in service data.

3. The method of claim 1 wherein each of said certain ranges is a multiple of about five percent.

4. The method of claim 1 further comprising the step of:

forming a table containing values corresponding to each of said discrete percentile groupings, wherein each of said values is substantially equal to a probable occurrence of said discrete percentile grouping.

5. The method of claim 1 wherein said step of creating a graph of said data by plotting each of said first and second metrics relative to each other further comprises the steps of:

creating a first axis which corresponds to said first measurable metric; and creating a second axis which corresponds to said second measurable metric.

6. The method of claim 4 wherein said step of forming a table containing values corresponding to each of said discrete percentile groupings, wherein each of said values is substantially equal to a probable occurrence of said discrete percentile grouping comprises the steps of:

creating a first axis which corresponds to said first measurable metric; and creating a second axis which corresponds to said second measurable metric.

7. The method of claim 1 further comprising the step of:

storing said data within a computer.

* * * * *